United States Patent
Barclay et al.

(10) Patent No.: US 9,445,343 B2
(45) Date of Patent: Sep. 13, 2016

(54) SYSTEMS FOR SWITCHING MODES IN WIRELESS SESSIONS

(71) Applicant: Alcatel-Lucent, Paris (FR)

(72) Inventors: Deborah Barclay, Winfield, IL (US); Bruno Landais, Pleumeur-Bodou (FR); Sudeep Palat, Swindon (GB); Alessio Casati, West Molesey (GB)

(73) Assignee: Alcatel Lucent, Boulogne-Billancourt (FR)

( * ) Notice: Subject to any disclaimer, the term of this patent is extended or adjusted under 35 U.S.C. 154(b) by 427 days.

(21) Appl. No.: 13/937,326

(22) Filed: Jul. 9, 2013

(65) Prior Publication Data

US 2015/0016347 A1 Jan. 15, 2015

(51) Int. Cl.
*H04W 40/02* (2009.01)
*H04W 68/00* (2009.01)
*H04W 76/02* (2009.01)
*H04W 76/04* (2009.01)
*H04W 76/06* (2009.01)

(52) U.S. Cl.
CPC ........... *H04W 40/02* (2013.01); *H04W 68/005* (2013.01); *H04W 76/021* (2013.01); *H04W 76/022* (2013.01); *H04W 76/041* (2013.01); *H04W 76/064* (2013.01)

(58) Field of Classification Search
None
See application file for complete search history.

(56) References Cited

U.S. PATENT DOCUMENTS

| | | | | |
|---|---|---|---|---|
| 2013/0122892 A1* | 5/2013 | Morioka | ............... | H04B 7/155 455/422.1 |
| 2013/0301611 A1* | 11/2013 | Baghel | .................. | H04W 72/04 370/331 |
| 2014/0242962 A1* | 8/2014 | Choi | ..................... | H04W 8/245 455/418 |

FOREIGN PATENT DOCUMENTS

EP 2683211 1/2014

OTHER PUBLICATIONS

3GPP TR 23.887, "Machine-Type and other Mobile Data Applications Communications Enhancements," section 5.1.1.3.6.3, Release 12, Jun. 2013.

* cited by examiner

*Primary Examiner* — Thai Nguyen
(74) *Attorney, Agent, or Firm* — Harness, Dickey & Pierce, P.L.C.

(57) ABSTRACT

At least one example embodiment discloses a network control entity including a memory and a processor. The processor is configured to receive a first message from a gateway if a user equipment (UE) is in a first data transmission mode having a first bearer path and the gateway has downlink user plane data for the UE associated with a second transmission mode, the first message identifying the base station serving the UE, and send a page request to the serving base station, the page request identifying the UE and instructing the serving base station to initiate a transition to the second data transmission mode for the UE, the second data transmission mode including a second bearer path between the UE and the network, the second bearer path and the first bearer path being different.

10 Claims, 5 Drawing Sheets

SYSTEMS FOR SWITCHING MODES IN WIRELESS SESSIONS

BACKGROUND

Embodiments relate to bearer activation (re-activation) in core networks for wireless devices.

An evolved packet system (EPS) network, for example, includes a core network called EPC (Evolved Packet Core) that can be accessed by a radio access network (RAN) called E-UTRAN.

An packet data network (PDN) connection (such as an IP connection) can be established over an EPS network, between an User Equipment UE and an external PDN (such as IP network). Traffic for a PDN connection in an EPS network is supported based on the concepts of bearers (or allocated network resources for said traffic all over the network and over different interfaces of the network). Procedures are defined for managing such bearers over different interfaces of the network and associated contexts in different nodes of the network. There are similar concepts in systems other than EPS, for example GPRS/UMTS.

SUMMARY

3GPP is studying the ability to transmit data over the user plane without establishing an S1-MME (Mobility Management Entity) control plane connection. This is called "connectionless data transmission" and is described in 3GPP TR 23.887, Machine-Type and other Mobile Data Applications Communications Enhancements, section 5.1.1.3.6.3, Release12 (June 2013). A UE may have some bearers assigned that can be established in this "connectionless" data transmission mode while other bearers use "connected" data transmission mode as defined in 3GPP.

While a UE is in connectionless mode for a bearer that is allowed, if downlink (DL) or uplink (UL) data is to be transmitted on another data bearer in a connected mode, the connectionless session should be transitioned to connected mode providing connected mode data transmission over both bearers. At least one example embodiment discloses a method of transitioning between connectionless and connected modes.

At least one example embodiment discloses a network control entity including a memory and a processor. The processor is configured to receive a first message from a gateway if a user equipment (UE) is in a first data transmission mode having a first bearer path and the gateway has downlink user plane data for the UE associated with a second transmission mode, the first message identifying the base station serving the UE, and send a page request to the serving base station, the page request identifying the UE and instructing the serving base station to initiate a transition to the second data transmission mode for the UE, the second data transmission mode including a second bearer path between the UE and the network, the second bearer path and the first bearer path being different and both bearer paths operating in the second data transmission mode after the transition.

In an example embodiment, the processor is configured to send the page request to only the serving base station.

In an example embodiment, the first message is a downlink data notification (DDN) message.

In an example embodiment, the page request is configured to cause the serving base station to instruct the UE to transition to the second data transmission mode over an existing bearer path between the UE and the serving base station that was established for the first data transmission mode.

In an example embodiment, the page request is configured to cause the serving base station to instruct the UE to release bearers associated with the first data transmission mode.

In an example embodiment, the page request is configured to cause the serving base station to instruct the UE to release radio resource control (RRC) signaling connection associated with the first data transmission mode.

In an example embodiment, the page request is configured to cause the serving base station to instruct the UE to transition to the second data transmission mode by sending an RRC Connection Release Request to release the RRC signaling connection used for the first data transmission mode, with an indication to request the UE to establish a new RRC signaling connection for the second data transmission mode, the indication being sent to only the UE.

In an example embodiment, the second data transmission mode includes a control plane between the serving base station and the network control entity.

In an example embodiment, the network control entity is a Mobility Management Entity (MME) or a Serving GPRS Support Node (SGSN), the gateway is a SGW (Serving Gateway), and the base station is an eNodeB or an RNC.

At least one example embodiment discloses a user equipment (UE) including a memory and a processor. The processor is configured to transition from a first data transmission mode to a second data transmission mode upon an application initiating an uplink data transmission requiring the second data transmission mode, instruct a serving base station to transition to the second data transmission mode over an existing bearer between the UE and the serving base station, the first data transmission mode having a first bearer path and the second data transmission mode having a second bearer path, the first and second bearer paths being different and both bearer paths operating in the second mode after the transition.

In an example embodiment, the processor is configured to cause existing radio resource control (RRC) signaling connection for the first data transmission mode to be released and a new radio resource control (RRC) signaling connection to be established for the second data transmission mode.

In an example embodiment, the processor is configured to transmit a RRC signaling connection release request to the serving base station requesting the release of the existing RRC signaling connection for the first data transmission mode with an indication to transition to the second data transmission mode.

In an example embodiment, the release request is configured to cause the serving base station to clear session resources associated with the UE in the first data transmission mode.

In an example embodiment, the release request is configured to cause the serving base station to notify the gateway of the transition such that the gateway will buffer any further downlink user data until the transition is complete.

In an example embodiment, the processor is configured to release of the existing RRC signaling connection for the first data transmission mode locally in the UE.

In an example embodiment, the UE is configured to transmit a RRC signaling connection establishment request to transition to the second data transmission mode after release of the existing RRC signaling connection.

In an example embodiment, the processor is configured to cause the UE to reconfigure bearers associated with the first data transmission mode into bearers associated with the second data transmission mode while activating bearers with the second data transmission mode that need to be activated.

At least one example embodiment discloses a user equipment (UE) including a memory and a processor. The processor is configured to transition from a first data transmission mode to a second data transmission mode upon a gateway having downlink user plane data for the UE associated with a second transmission mode, the transition being based on a network control entity receiving a first message from a gateway, the first message identifying a base station serving the UE, and the network control entity sending a page request to the serving base station, the page request identifying the UE and instructing the serving base station to initiate a transition to the second data transmission mode for the UE, the second data transmission mode including a second bearer path between the UE and the network, the second bearer path and the first bearer path being different and both bearer paths operating in the second data transmission mode after the transition.

At least one example embodiment discloses a method for initiating a switch between modes in a wireless session. The method includes receiving a first message from a gateway if a user equipment (UE) is in a first mode having a first bearer path, the first message identifying a serving base station of the UE, and sending a page request to the serving base station, the page request identifying the UE and instructing the serving base station to initiate a transition to a second mode for the UE, the second mode including a second bearer path between the UE and the network control entity, the second bearer path and the first bearer path being different.

In an example embodiment, the processor is configured to send the page request to only the serving base station.

In an example embodiment, the first message is a downlink data notification (DDN) message.

In an example embodiment, the page request is configured to cause the UE to release bearers associated with the first mode.

In an example embodiment, the page request is configured to cause the UE to release radio resource control (RRC) signaling associated with the first mode.

In an example embodiment, the page request is configured to cause the serving base station to instruct the UE to transition to the second mode over an existing bearer between the UE and the serving base station.

In an example embodiment, the second mode includes a control plane between the serving base station and the network entity. At least one example embodiment discloses a network control entity including a memory and a processor. The processor is configured to control a transition from a first data transmission mode of a user equipment (UE) to a second data transmission mode of the UE upon an application of the UE initiating an uplink data transmission requiring the second data transmission mode and control a serving base station of the UE to transition to the second data transmission mode over an existing bearer between the UE and the serving base station, the first data transmission mode having a first bearer path and the second data transmission mode having a second bearer path, the first and second bearer paths being different.

At least one example embodiment discloses a user equipment (UE) including a memory and a processor. The processor is configured to receive, from a serving base station, a request to release a radio resource control (RRC) signaling connection associated with a first data transmission mode and transition from the first data transmission mode to the second data transmission mode based on the request to release.

BRIEF DESCRIPTION OF THE DRAWINGS

Example embodiments will be more clearly understood from the following detailed description taken in conjunction with the accompanying drawings. FIGS. 1-5B represent non-limiting, example embodiments as described herein.

FIG. 1 illustrates a network for wireless devices according to an example embodiment;

FIG. 2 illustrates a Service Request Procedure for connected mode as described in 3GPP TR 23.887;

FIG. 3 illustrates a Service Request Procedure as described in 3GPP TR 23.887 for connectionless mode;

FIG. 4 illustrates a method of switching from a connectionless mode to a connected mode according to an example embodiment;

FIG. 5B illustrates an example embodiment of the network control entity (e.g., MME) in FIG. 1.

DETAILED DESCRIPTION

Figure 1:
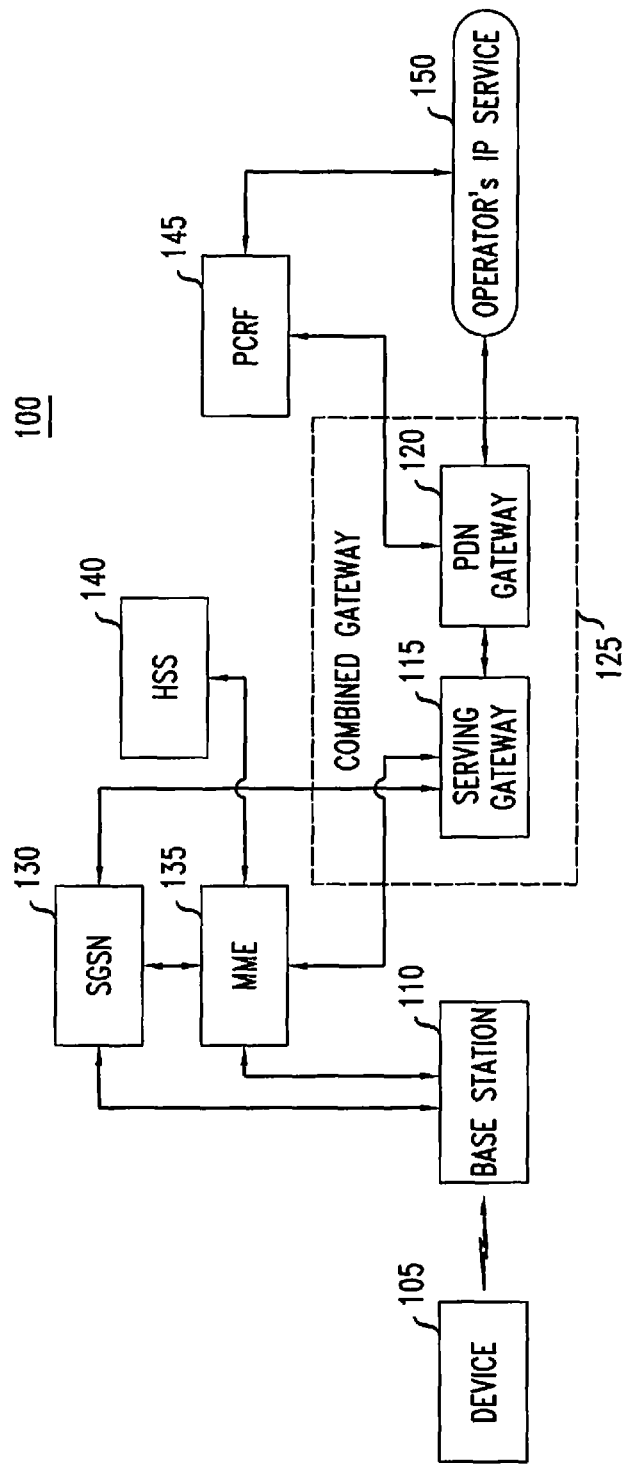

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A processor and a memory may operate together to run apparatus functionality. For example, the memory may store code segments regarding apparatus functions. The code segments may in-turn be executed by the processor. Further, the memory may store process variables and constants for use by the processor.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

FIG. 1 illustrates a network 100 for wireless devices according to an example embodiment. The network 100 includes a base station 110, a serving gateway 115, a packet data network (PDN) gateway 120, Serving General Packet Radio Service (GPRS) Support Node (SGSN) 130, a Mobility Management Entity (MME) 135, a Home Subscriber Server (HSS) 140 and a Policy Control and Charging Rules Function (PCRF) 145. The base station 110 may be an eNodeB or a Radio Network Controller (RNC), for example. Each of the base station 110, the serving gateway 115, the packet data network (PDN) gateway 120, the SGSN 130, the Mobility Management Entity (MME) 135, the Home Subscriber Server (HSS) 140 and the Policy Control and Charging Rules Function (PCRF) 145 include one or more processors and an associated memory operating together to run apparatus functionality.

The network 100 communicates with one or more wireless devices 105 via base station 110. The network 100 communicates with one or more operators IP services 150 via the PDN gateway 120 and the PCRF 145. The serving gateway 115 and the PDN gateway 120 may be combined into a single combined gateway 125.

The network 100 may be an Evolved Packet Core (EPC) Network connected to an Evolved Universal Terrestrial Radio Access Network (E-UTRAN) or a Universal Terrestrial Radio Access Network (UTRAN). Long Term Evolution (LTE) is the name given to a project to improve the Universal Mobile Telecommunications System (UMTS) standard to cope with future requirements. In one aspect, UMTS has been modified to provide for the E-UTRAN as a fourth generation (4G) wireless network.

As is known, E-UTRAN may provide uplink (UL) and downlink (DL) channels for signaling and data transmissions. For example, a channel for Broadcast Control Channel (BCCH), Physical Uplink Control Channel (PUCCH), Physical Uplink Shared Channel (PUSCH), Physical Downlink Control Channel (PDCCH), Physical Downlink Shared Channel (PDSCH) and the like.

Generally, the base station 110, the serving gateway 115, the packet data network (PDN) gateway 120, the Serving General Packet Radio Service (GPRS) Support Node (SGSN) 130, the Mobility Management Entity (MME) 135, the Home Subscriber Server (HSS) 140 and the Policy Control and Charging Rules Function (PCRF) 145 are known to those skilled in the art. Therefore, with the exception of the below example embodiments, the elements of FIG. 1 will not be described further for the sake of brevity.

Figure 2:
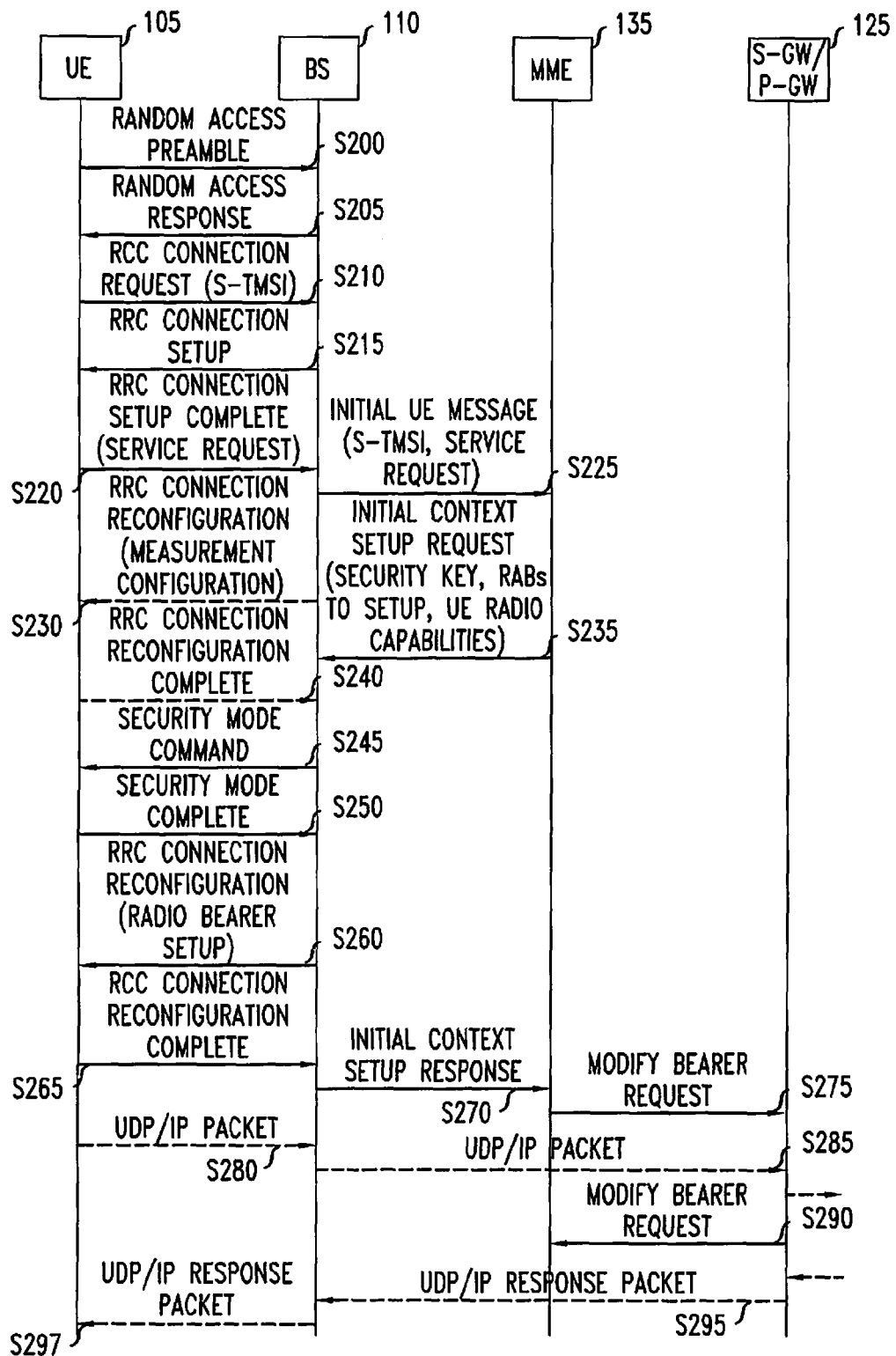

FIG. 2 illustrates a Service Request Procedure as described in 3GPP TR 23.887 (and 3GPP TS 23.401 section 5.34) for connected mode. In FIG. 2, the base station 110 establishes a connected mode bearer between the base station 110 and the S-GW/P-GW 125 and a control plane connection between the base station 110 and MME 135. At S200, the UE 105 transmits a random access preamble to the base station 110. The base station 110 transmits a response at S205. At S210, the UE 105 transmits a Radio Resource Control (RRC) Connection Request. The base station 110 responds to the request by transmitting a RRC Connection Setup at S215.

At S220, the UE 105 acknowledges the RRC connection setup and requests service. The base station 110 transmits the Service Request at S225 to the MME 135 which initiates the S1-MME control plane connection establishment. The base station 110 may also reconfigure the RRC connection at S230. At S240, the UE 105 may transmit an acknowledgement to the base station 110 that the reconfiguration is complete.

At S235, the MME 135 transmits an initial context setup request. The setup request identifies a security key and radio capabilities, for example. At S235, the base station 110 receives bearer information including a tunnel identifier (e.g., a gateway tunnel identifier) from the MME 135 (the MME 135 may also be known as network control entity). For example, the base station 110 may receive an S1-MME UE Initial Context Setup Request message from the MME 135. The message may include the serving gateway 115 address, gateway tunnel endpoint ID(s) (TEID) for the evolved packet system (EPS) bearers.

The base station 110 stores the tunnel identifier (e.g., the gateway tunnel identifier) and allocates and stores a base station tunnel identifier and base station identifier (e.g., a base station IP address).

At S245, the base station 110 issues a security mode command to the UE 105 based on the setup request. At S250, the UE 105 transmits an acknowledgement to the base station 110 that the security mode is complete.

At S260, the base station 110 sets up a radio bearer by transmitting an RRC Connection Reconfiguration to the UE 105. The UE 105 completes the bearer setup by transmitting an acknowledgement to the base station 110 at S265. For example, in response to the Initial UE Context Setup Request message received from the MME 135, the base station 110 may establish a radio bearer. The base station 110 may perform the radio bearer establishment procedure described in more detail in 3GPP TS 23.401.

At S265, a data radio bearer (DRB) between the UE 105 and the base station 110 is established. At S270, the base station 110 transmits a response to the initial context setup request to the MME 135. At S275, the MME 135 transmits a modify bearer request to the S-GW/P-GW 125. The modify bearer request message normally includes information about each bearer to be reactivated for the device 105 and the base station 110 TEID for each bearer. The bearer is identified implicitly by the tunnel endpoint identifier to which the packet is sent from the base station 110 to the serving gateway 115, or, alternatively the combined gateway 125, so only the base station transport address and TEID may be included in the first uplink data packets.

At S280, the UE 105 forwards a data packet to the base station 110, which then forwards the data to S-GW/P-GW 125 over an S1 tunnel.

At S290, the S-GW/P-GW 125 transmits a modified bearer response and then can start to transmit any downlink data packets at S295 to the base station 110. The base station 110 then forwards the downlink data packets to the UE 105 at S297.

FIG. 2 is further described in 3GPP TR 23.887. Therefore, for the sake of brevity, FIG. 2 will not be described in further detail.

Figure 3:
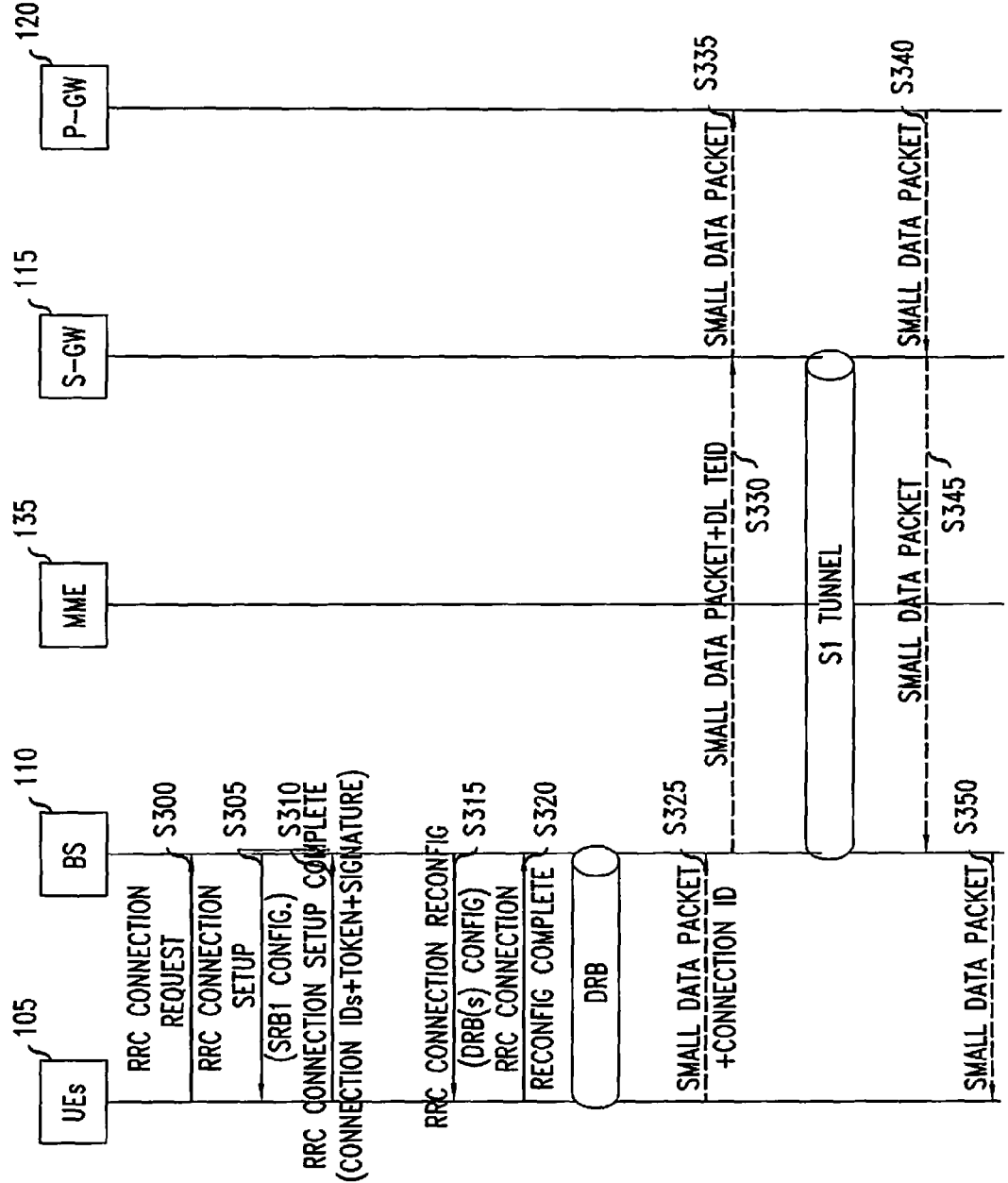

FIG. 3 illustrates a Service Request Procedure as described in 3GPP TR 23.887 for connectionless mode.

At S300, the UE 105 transmits a Radio Resource Control (RRC) Connection Request. The base station 110 responds to the request by transmitting a RRC connection setup at S305. The RRC connection setup includes a signaling radio bearer (SRB1) configuration.

At S310, the UE 105 acknowledges the connection setup and includes the Connection Id and token to initiate connectionless mode. The base station 110 then reconfigures the RRC connection at S315, which configures a data radio bearer (DRB) for connectionless mode. The UE 105 acknowledges the reconfiguration at S320.

At S325, the UE 105 transmits data to the base station 110, which then forwards the data to the S-GW 115 at S330 and includes a base station DL TEID in a GTP-U header. The data is forwarded to the S-GW 115 through an S1 tunnel. At S335, the S-GW 115 transmits the data to the P-GW 120. In response to the data sent from the UE 105, the P-GW 120 sends a response to the uplink data and pending downlink data at S340 to the S-GW 115, which forwards the data to the base station 110 at S345 using the base station DL TEID received at S330. The base station 110 provides the UE with the data at S350.

FIG. 3 is further described in 3GPP TR 23.887. Therefore, for the sake of brevity, FIG. 3 will not be described in further detail.

Downlink

Figure 4:
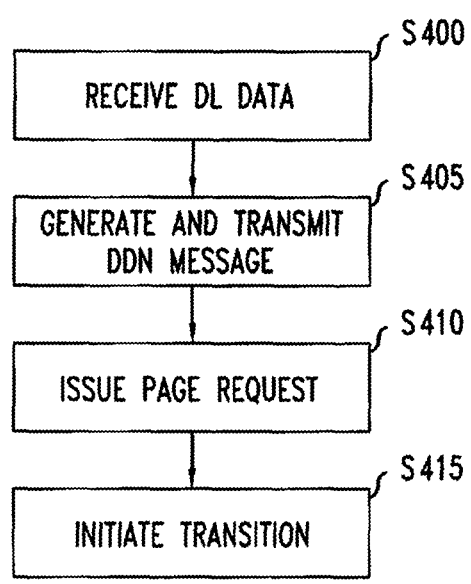

FIG. 4 illustrates a method of switching from a connectionless mode to a connected mode according to an example embodiment. The method of FIG. 4 may be performed by the network 100.

Generally, if a UE is idle (ECM-idle mode) and downlink (DL) data arrives at a S-GW for the UE, the S-GW sends a Downlink Data Notification (DDN) message to the MME. The MME then sends a Page request to each of the base stations in the tracking area the UE is registered in. The tracking area may include numerous cells.

When bearers are originally created (e.g., when the UE attaches to the network), the MME determines which created bearers can use the connectionless data transmission mode. If so, the MME includes this indication in the request to the SGW when creating the bearers. The SGW stores this in the context the SGW has for the UE.

If the UE is active in a connectionless mode, as established in FIG. 3, transmitting data over one of the connectionless bearers assigned to the UE, and DL data arrives at the S-GW for the UE on one of the bearers that is not allowed connectionless transmission, the UE and network transition to a connected mode.

The method of FIG. 4 takes advantage of the knowledge the S-GW has regarding the base station identity that is serving the UE in connectionless mode.

At S400, the S-GW receives DL data for the UE. Upon receipt of DL data for a bearer not allowed connectionless transmission, the S-GW sends a downlink data notification (DDN) message to the MME including the serving base station identity at S405.

The S-GW buffers all DL data for the UE, including any new DL data associated with the connectionless bearers until the transition to connected mode is complete.

At S410, the MME issues a page request only to the base station identified in the DDN message. The MME includes a cookie that identifies the target UE, described in the connectionless solution in TR 23.887, to enable the base station to associate the page request with the connectionless transmission of the UE in order for the base station to initiate a transition to connected mode. The cookie represents the UE identity while the UE is attached to the network.

When the base station receives the page request with the cookie (representing the UE identity), the base station correlates the page request with the connectionless session for the UE (i.e. the RRC signaling connection established for data transmission in connectionless mode). Once correlated, the base station initiates a procedure to transition the UE from connectionless mode to a connected mode session that includes establishment of the connected mode bearers at S415. When in connected mode, there is an S1-MME control plane connection to the MME and handovers are supported in connected mode so the base station is then evaluating the radio conditions reported in UE measurements for handover.

In one embodiment, the base station sends an indication to the UE to release the connectionless bearers (and the associated RRC signaling connection) and initiates a new RRC signaling connection for data transmission in the connected mode. The indication, which can take the form of an RRC signaling connection release request with new additional information signaling the need to transition to connected mode, substitutes the need for the base station to broadcast a Page request since the base station can send the indication over the existing signaling radio bearer assigned to the UE.

On reception of this indication, the UE releases the existing RRC signaling connection and initiates RRC connection procedures. For example, the UE may initiate the RRC procedures shown in FIG. 2 to establish a connected mode bearer path.

The system impacts can be reduced by tearing down the existing signaling connection used for the connectionless mode and establishing a new RRC signaling connection for connection oriented data transmission. The configuration of the RRC signaling connection is indeed different in both modes, e.g. different security procedures are used, UE measurements to be initiated for the connection oriented mode.

Consequently, many page request messages from the MME to all the other base stations in the tracking area do not have to be made and broadcast radio resources in the entire tracking area are save since the base station uses the active signaling radio bearer associated with the connectionless data transmission to indicate to the UE to transition to the connected mode.

In another embodiment, the UE and base station convert the connectionless bearers (and RRC signaling connection) to connected mode bearers while activating the connected mode bearers to be activated.

If the UE happened goes to idle mode before the base station receives the page request, or if the base station did not find an active connectionless session for the UE associated with the cookie, then the base station performs a conventional paging procedure. If the UE does not respond to the page request, the MME repeats existing paging procedures, this time sending a Page request to all the base stations in the tracking area.

Uplink

If the UE is active in connectionless mode, transmitting data over one of the connectionless bearers assigned to the UE, and then another application on the UE initiates Uplink Data (UL) data transmission for a bearer not allowed connectionless transmission, the UE and network transition to connected mode.

When bearers are first created, if allowed in connectionless mode, a connection id and token are created for the bearer. The UE stores the connection id and token. If there is no connection id and token, then the UE knows connected mode is to be used.

In one embodiment, the RRC signaling connection for connectionless transmission is released and a new one is established for connection mode. The UE may initiate the release of the existing RRC signaling connection locally in the UE. When the release is complete, the UE initiates the establishment of a new RRC signaling connection for connected mode as described in FIG. 2.

In another embodiment, the UE requests the release of the existing RRC signaling connection, by sending a RRC release request to the base station. The request informs the base station that the UE is requesting to transition to the connected mode. Upon reception of the request, the base station transitions to the connected mode, as in the DL case. The base station releases the connectionless bearers (and the associated RRC signaling connection). The base station also notifies the S-GW of the transition such that the S-GW buffers any further DL data until the transition is complete. The base station may notify the S-GW of the transition by including a transition indication in a GTP-U header of a dummy packet sent over the tunnel to the S-GW associated with an active connectionless bearer of the UE.

Following the release procedures, the UE initiates RRC connection establishment procedure for connected mode (e.g., FIG. 2). The base station saves a SAE Temporary Mobile Subscriber Identity (S-TMSI) UE identifier received in the RRC Connection Request of the connectionless mode establishment. When the RRC Connection Request is sent by the UE for connected mode establishment, the S-TMSI is again included. When received for the connected mode establishment, the base station uses the S-TMSI to correlate the connected mode request with the UE in transition so that the base station can clear any remaining connectionless session resources associated with the UE.

In another embodiment, further operations may be performed if the connectionless bearers (and RRC signaling connection), are not first released, and instead the UE and base station converts the connectionless bearers (and RRC signaling connection) to connected mode bearers while activating the connected mode bearers that need to be activated.

While example embodiments are described with reference to LTE/E-UTRAN, example embodiments also apply to UTRAN in the Evolved Packet Core (EPC). In the UTRAN, the RAN node is an RNC and the mobility management functional entity is a SGSN.

Figure 5A:
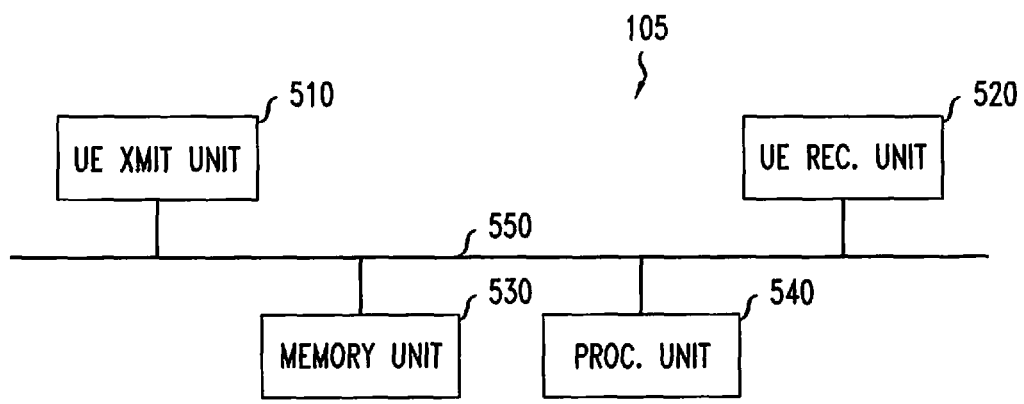
FIG. 5A illustrates an example embodiment of the UE in FIG. 1.

FIG. 5A illustrates an example embodiment of the UE 105. It should be also understood that the UE 105 may include features not shown in FIG. 5A and should not be limited to those features that are shown.

The UE 105 is configured to transition from a connectionless mode to a connected mode.

The UE 105 may include, for example, a transmitting unit 510, a UE receiving unit 520, a memory unit 530, a processing unit 540, and a data bus 550.

The transmitting unit 510, UE receiving unit 520, memory unit 530, and processing unit 540 may send data to and/or receive data from one another using the data bus 550. The transmitting unit 510 is a device that includes hardware and any necessary software for transmitting wireless signals on the uplink (reverse link) including, for example, data signals, control signals, and signal strength/quality information via one or more wireless connections to other wireless devices (e.g., base stations).

The UE receiving unit 520 is a device that includes hardware and any necessary software for receiving wireless signals on the downlink (forward link) channel including, for example, data signals, control signals, and signal strength/quality information via one or more wireless connections from other wireless devices (e.g., base stations). The UE receiving unit 520 receives information from the base station 110.

The memory unit 530 may be any storage medium capable of storing data including magnetic storage, flash storage, etc.

The processing unit 540 may be any device capable of processing data including, for example, a microprocessor configured to carry out specific operations based on input data, or capable of executing instructions included in computer readable code. The processing unit 540 is configured to transition from a connectionless mode to a connected mode upon an application initiating an uplink data transmission requiring the connected mode such that existing radio resource control (RRC) signaling is released. The connectionless mode has a first bearer path and the connected mode having a second bearer path where the first and second bearer paths are different and both bearer paths are in connected mode after the transition is complete.

Figure 5B:
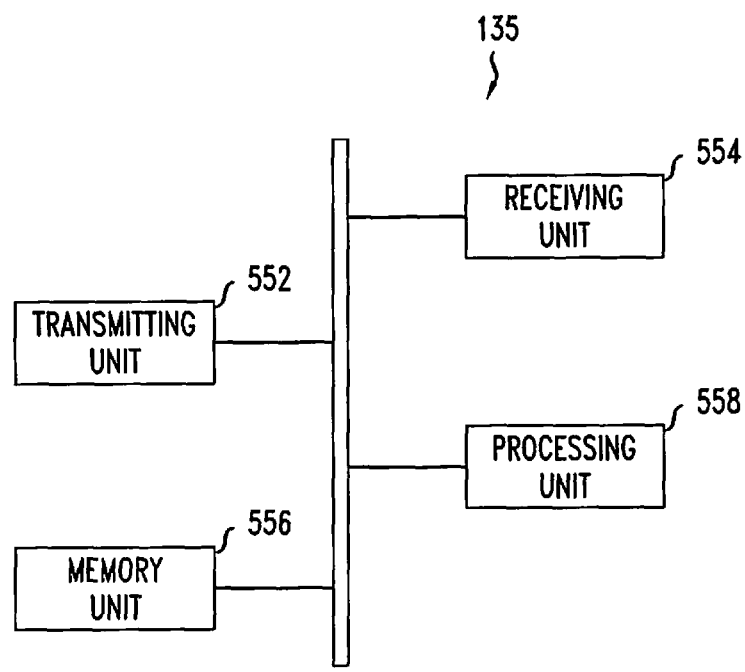

FIG. 5B illustrates an example embodiment of a network entity such as the MME 135. While FIG. 5B is used to describe the MME 135, it should be understood that other network entities, such as the SGSN 130, may have a similar structure. It should be also understood that the MME 135 may include features not shown in FIG. 5B and should not be limited to those features that are shown.

Referring to FIG. 5B, the MME 135 may include, for example, a data bus 559, a transmitting unit 552, a receiving unit 554, a memory unit 556, and a processing unit 558.

The transmitting unit 552, receiving unit 554, memory unit 556, and processing unit 558 may send data to and/or receive data from one another using the data bus 559. The transmitting unit 552 is a device that includes hardware and any necessary software for transmitting wireless signals including, for example, data signals, control signals, and signal strength/quality information via one or more wireless connections to other network elements in the wireless communications network 100.

The receiving unit 554 is a device that includes hardware and any necessary software for receiving wireless signals including, for example, data signals, control signals, and signal strength/quality information via one or more wireless connections to other network elements in the network 100.

The memory unit 556 may be any device capable of storing data including magnetic storage, flash storage, etc. The memory unit 256 is used for data and controlling signal buffering and storing for supporting pre-scheduling and the scheduled data transmissions and re-transmissions.

The processing unit 558 may be any device capable of processing data including, for example, a microprocessor configured to carry out specific operations based on input data, or capable of executing instructions included in computer readable code.

For example, the processing unit 558 is capable of receiving a first message from a gateway if a user equipment (UE) is in a connectionless mode having a first bearer path, the first message identifying the base station currently serving the UE, and sending a page request to the serving base station, the page request identifying the UE and instructing the serving base station to initiate a transition to a connected mode for the UE, the connected mode including a second bearer path between the UE and the network control entity, the second bearer path and the first bearer path being different and both bearer paths are in connected mode when the transition is complete.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A network control entity comprising:
   a memory configured to store instructions; and
   a processor configured to execute the instructions to
   receive a first message from a gateway if a user equipment (UE) is in a connectionless transmission mode having a first bearer path and the gateway has downlink user plane data for the UE associated with a connected transmission mode, the first message identifying a base station serving the UE, and
   send a page request to the serving base station, the page request identifying the UE and instructing the serving base station to initiate a transition from the connectionless transmission mode to the connected transmission mode for the UE, the connected transmission mode including a second bearer path between the UE and a network, the second bearer path and the first bearer path being different.

2. The network control entity of claim 1, wherein the processor is configured to send the page request to only the serving base station.

3. The network control entity of claim 1, wherein the first message is a downlink data notification (DDN) message.

4. The network entity of claim 1, wherein the page request is configured to cause the serving base station to instruct the UE to transition to the connected transmission mode over an existing bearer path between the UE and the serving base station that was established for the connectionless transmission mode.

5. The network control entity of claim 1, wherein the page request is configured to cause the serving base station to instruct the UE to release bearers associated with the connectionless transmission mode.

6. The network control entity of claim 5, wherein the page request is configured to cause the serving base station to instruct the UE to release radio resource control (RRC) signaling connection associated with the connectionless transmission mode.

7. The network entity of claim 6, wherein the page request is configured to cause the serving base station to instruct the UE to transition to the connected transmission mode by sending an RRC Connection Release Request to release the RRC signaling connection used for the connectionless transmission mode, with an indication to request the UE to establish a new RRC signaling connection for the connected transmission mode, the indication being sent to only the UE.

8. The network control entity of claim 1, wherein the connected transmission mode includes a control plane between the serving base station and the network control entity.

9. The network control entity of claim 1, wherein the network control entity is a Mobility Management Entity (MME) or a Serving GPRS Support Node (SGSN), the gateway is a SGW (Serving Gateway), and the base station is an eNodeB or an RNC.

10. A network control entity comprising:

a memory configured to store instructions; and a processor configured to execute the instructions to control a transition, by a serving base station, from a connectionless transmission mode of a user equipment (UE) to a connected transmission mode of the UE upon an application of the UE initiating an uplink data transmission requiring the connected transmission mode, and control the serving base station of the UE to transition to the connected transmission mode over an existing bearer between the UE and the serving base station, the connectionless transmission mode having a first bearer path and the connected transmission mode having a second bearer path, the first and second bearer paths being different.

* * * * *